United States Patent [19]

Elkins et al.

[11] 4,146,012
[45] Mar. 27, 1979

[54] SOLAR HEAT EXCHANGE PANEL

[75] Inventors: William Elkins, San Jose; E. Glenn Tickner, Mountain View, both of Calif.

[73] Assignee: Acurex Corporation, Mountain View, Calif.

[21] Appl. No.: 783,409

[22] Filed: Mar. 31, 1977

Related U.S. Application Data

[62] Division of Ser. No. 706,697, Jul. 19, 1976.

[51] Int. Cl.² .................................................. F24J 3/02
[52] U.S. Cl. .................................. 126/271; 165/172; 165/175
[58] Field of Search ............... 126/270, 271; 237/1 A; 165/170–175, 180

[56] References Cited

U.S. PATENT DOCUMENTS

| 2,427,262 | 9/1947 | Delano | 126/271 |
| 2,445,350 | 7/1948 | Ginnings | 126/271 |
| 3,022,781 | 2/1962 | Andrassy | 126/271 |
| 3,868,945 | 3/1975 | Konopka | 126/271 |
| 4,021,901 | 5/1977 | Kleine et al. | 126/271 |
| 4,060,070 | 11/1977 | Harter | 126/271 |
| 4,079,726 | 3/1978 | Voelker | 126/271 |

FOREIGN PATENT DOCUMENTS

| 2442529 | 3/1976 | Fed. Rep. of Germany | 126/271 |
| 1301853 | 1/1973 | United Kingdom | 126/271 |

Primary Examiner—Kenneth W. Sprague
Assistant Examiner—James C. Yeung
Attorney, Agent, or Firm—Flehr, Hohbach, Test, Albritton & Herbert

[57] ABSTRACT

Solar heat exchange panel manufactured by a high speed rotogravure or heat sealing process wherein two elongated sheets of flexible plastic film are laminated together along lines defining inlet and outlet manifolds and a plurality of flow passages. The manifolds extend substantially the entire length of the sheets, and the flow passageways are arranged in groups to form individual heat exchanger sections which are served by the manifold. Mounting loops are provided along the lateral edges of the panel and adapted for receiving elongated rods by which the panel can be tethered or secured to another such panel.

9 Claims, 3 Drawing Figures

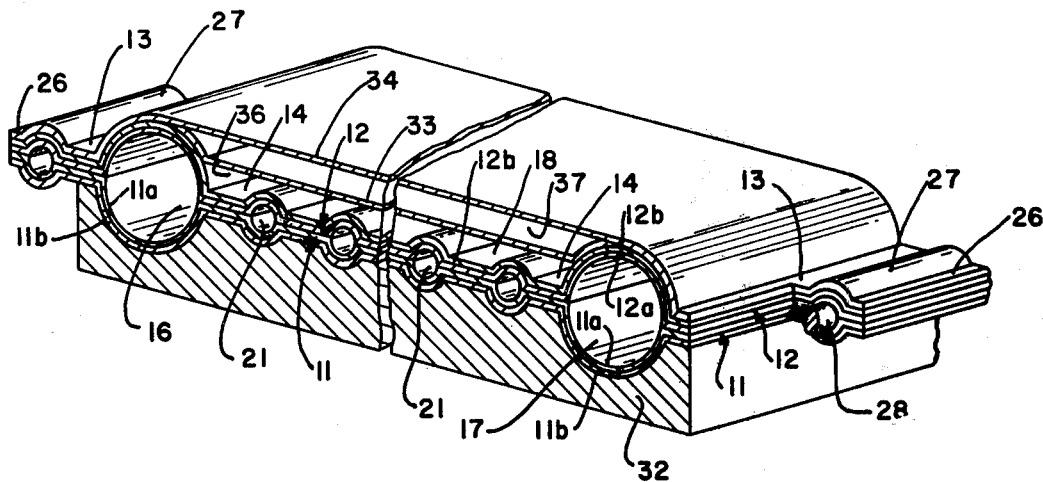
FIG.—1
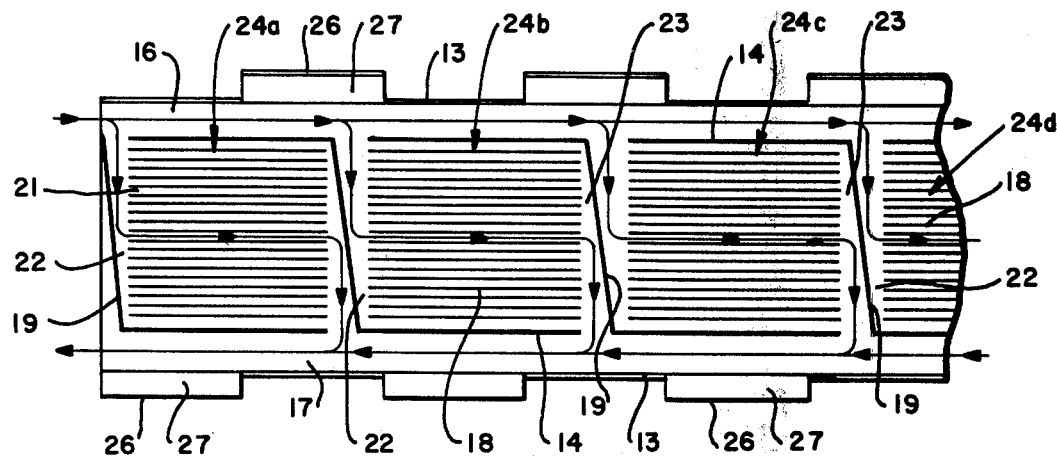
FIG.—2

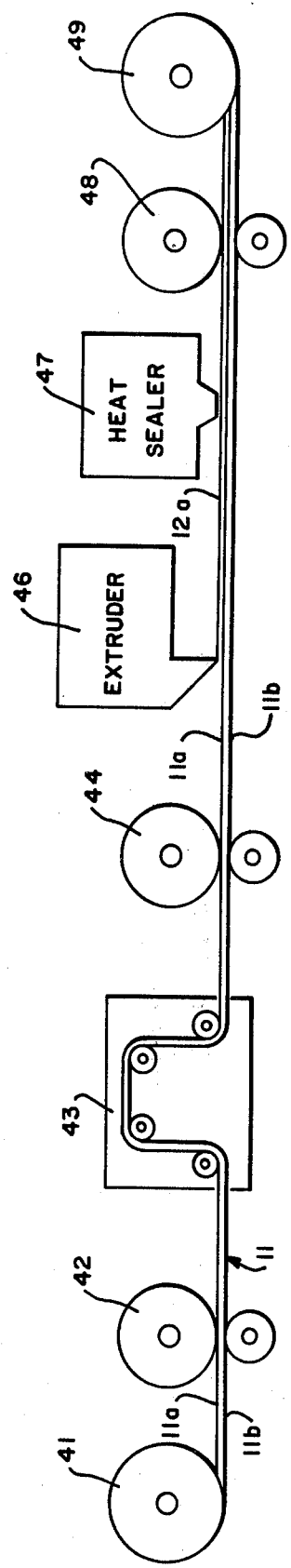
FIG.—3

SOLAR HEAT EXCHANGE PANEL

This a division, of application Ser. No. 706,697 filed July 19, 1976.

BACKGROUND OF THE INVENTION

This invention pertains generally to heat exchangers and more particularly to a solar heat exchange panel and method of manufacturing the same.

In recent years, it has been recognized that solar energy represents a substantially inexhaustible energy source, whereas fossil fuels such as oil, gas and coal are limited in supply and rising in cost. There have been some efforts to utilize solar energy in applications such as space heating and water heating to make more fossil fuel available for applications such as transportation and electric power generation.

Even though solar energy is available at no cost, collectors heretofore provided for gathering solar energy have made this form of energy more costly than fossil fuels. Prior art collectors have been made of wood, metal, glass and rigid plastic, and they are relatively expensive to construct. The size and weight of such collectors make them difficult to handle and result in high shipping, storage and installation costs. The cost of prior art collectors is further increased by the plumbing generally required in their installation.

SUMMARY AND OBJECTS OF THE INVENTION

The invention provides a solar energy collector panel which can be manufactured and installed at substantially less cost than collectors of the prior art. The panel is fabricated of elongated sheets of flexible plastic film and/or coated fabric by a high speed printing and heat sealing process, and the panel can be rolled into a lightweight roll for convenience in shipping, storage and installation. Two superposed sheets of the plastic film are joined along lines defining inlet and outlet manifolds and a plurality of flow passageways. The manifolds extend substantially the entire length of the sheets, and the flow passageways are arranged in groups forming individual heat exchanger sections served by the manifolds. Mounting loops are provided along the lateral edges of the panel and adapted for receiving elongated rods for tethering the panel or securing two or more such panels together.

It is in general an object of the invention to provide a new and improved solar heat exchange panel and method of manufacturing the same.

Another object of the invention is to provide a heat exchange panel and method of the above character utilizing a high speed printing, extrusion bonding or heat sealing technique to fabricate the panel.

Another object of the invention is to provide a heat exchange panel which is light in weight and economical to manufacture and install.

Additional objects and features of the invention will be apparent from the following description in which the preferred embodiments are set forth in detail in conjunction with the accompanying drawings.

BRIEF DESCRIPTION OF THE DRAWINGS

FIG. 1 is an isometric sectional view of one embodiment of a heat exchange panel according to the invention.

FIG. 2 is a schematic top plan view of the heat exchange panel of FIG. 1.

FIG. 3 is a schematic drawing illustrating a preferred method of manufacturing a heat exchange panel according to the invention.

DESCRIPTION OF THE PREFERRED EMBODIMENT

As illustrated in FIGS. 1 and 2, the solar heat exchange panel comprises first and second elongated, superposed sheets 11, 12, each comprising two layers or films of flexible material laminated together. In one presently preferred embodiment, sheet 11 includes a layer of nylon or polyethylene 11a laminated to a layer of polyester material 11b, and sheet 12 includes a layer 12a of nylon of polyethlene laminated to a polyester material which is then laminated to a layer of solar energy absorbent maternal 12b. Suitable materials for layer 12b include a black polyvinylfluoride film, such as Tedlar, or a black polyester film such as ultraviolet stablized Mylar. Other suitable material for sheets 11 and 12 include polybutylene, polypropylene copolymers, multi-polymers, metal and high density polyethylenes, Surlyn ionmer resins, ethylene acrylic acid copolymer films, ethylenevinly acetate copolymer films, polyurethane and coextrusions of these various film types. The laminations of each sheet are preferably bonded together by the rotogravure process in conjunction with extrusion bonding.

Sheets 11 and 12 are joined together along longitudinally extending lines 13, 14 to form an inlet manifold 16 and an outlet manifold 17. The sheets are also joined together along lines 18, 19 to form flow passageways 21 and plenum chanbers 22, 23 in fluid communication with the inlet and outlet manifolds. As best illustrated in FIG. 2, the manifolds extend substantially the entire length of the sheets, and the flow passageways are arranged in groups forming individual heat exchanger sections 24a–25n spaced longitudinally of the sheets. As discussed more fully hereinafter, in one embodiment, the bonds between the sheets are formed by applying a suitable adhesive along the desired lines on one of the sheets by means of a rotogravure cylinder on a rotary press. In the embodiment illustrated, the pattern of flow passageways is repeated once for each revolution of the cylinder, while the inlet and outlet manifolds extend continously. The adhesive used depends upon the materials of which the sheets are fabricated, and for polyamide (nylon) sheets, suitable adhesives include ether and ester types of the polyurethane resin system. The particular arrangement of flow passageways and manifolds is only exemplary, and other configurations can be utilized.

In another embodiment, a parting agent is applied between desired bond lines by the rotogravure cylinder, and the sheets are then bonded together along the desired lines by heat sealing to form the manifolds and flow passageways. In a third embodiment, which is the presently preferred embodiment, a parting agent is again applied, and the sheets are bonded around the parting agent by an extrusion bonding technique.

The lateral edges of sheets 11, 12 are joined together along lines 26 to form longitudiannly spaced apart loops 27 adapted to receive mounting rods 28. The loops along the opposite edges of the sheets are offset longitudinally in such manner that the loops along one edge of one panel can be interposed between the loops along the confronting edge of a second panel and the panels can be interlocked by means of a rod extending through the interposed loops.

Insulating material 32 is bonded to the outer surface of sheet 12. In the preferred embodiment, the insulating material is applied to sheet 12 by the rotogravure process and then expanded by heat to form a continuous foam covering. Alternatively, if desired, one or more sheets of polyester film can be bonded to the outer edges of sheet 12 in place of the foam, and the spaces between the sheet and the additional layers can be inflated with air to provide thermal insulation.

Additional sheets of flexible material 33, 34 are bonded to sheet 11 toward the outer edges thereof to form chambers 36, 37 which can be inflated to provide additional thermal insulation. Sheets 33, 34 are preferably fabricated of a flexible plastic film which is opaque to ultraviolet radiation, such as polyvinyl fluoride film or untraviolet stablized polyester film. If desired, sheets 36, 37 can be omitted, with some reduction in the performance of the device.

Operation and use of the solar heat exchange panel can be described briefly. It is assumed that the panel has been mounted in a suitable location for exposure to the sun's rays and that chambers 33, 34 have been inflated with air. It is further assumed that manifolds 16, 17 are closed at one end and connected at the other end for receiving and discharging a circulating liquid. The inlet manifold delivers the liquid to the inlet plenum chambers 22 for the respective heat exchanger sections 24a–24n. The plenum chambers deliver the liquid to passageways 21 from which the liquid passes through outlet plenum chambers 23 to the outlet manifold. As the fluid passes through the heat exchange panel, it absorbs solar energy in the form of heat which can be utilized as desired. The materials of which layer 12b and sheets 33, 34 are fabricated tend to enhance the absorption of solar energy and produce higher temperatures in the liquid. Insulator 32 and insulating chambers 36, 37 serve to prevent undesired transfer of heat away from the fluid.

A preferred method of manufacturing the heat exchange panel is illustrated in FIG. 3. In this process, a layer of nylon or polyethylene film 11a is laminated to a layer of polyester film 11b to form sheet 11, which is formed into a roll 41 and stored until cured. The two ply film thus formed is fed from roll 41 through a printing press, with the polyester layer facing down, and a rotogravure cylinder 42 applies a parting agent to the exposed upper surface of the nylon or polyethylene layer. The parting agent is applied in a pattern which is the negative of the pattern lines along which sheet 11 will be bonded to sheet 12. The film then passes through an oven 43 to dry the parting agent, following which the film is cooled by passing beneath a quench roller 44.

After the film passes the quench roller, an extruder 46 applies a layer of nylon or polyethylene film 12a onto the upper surface of the two ply film. The three plys then pass together through a heat sealing station 47 where the confronting surfaces of films 11a and 12a are bonded together in the areas in which the parting agent has not been applied. The three ply film is cooled quickly by a second quench roller 48, then formed into a roll 49 and allowed to cure.

Once the three ply structure has cooled, a layer of polyester film is laminated onto the exposed surface of layer 12a, and a layer of black Tedlar film is laminated onto the new layer. Insulating material 32 and layers 33, 34 are then applied, following which lateral edges of the structure are cut to form the offset mounting loops 27. Subsequently, the material can be removed from the roll and cut into panels of the desired length and number of sections for installation.

Another preferred method of manufacture, sometimes referred to herein as extrusion bonding, is similar to the method of FIG. 3 except that a separate heat sealing step is not required. In the extrusion bonding technique, extruder 46 applies the nylon or polyethylene layer 12a in molten form, and this layer bonds immediately to layer 11a in the regions in which the parting agent has not been applied.

The invention has a number of important features and advantages. It provides a solar collector panel which is light in weight and economical to manufacture, ship and install. The inlet and outlet manifolds extend substantially the entire length of the panel and serve all of the heat exchanger sections, thereby eliminating the need for external plumbing other than one inlet connection and one outlet connection. The rotogravure process by which the panels are manufactured is fast and particularly suitable for mass production of the panels.

It is apparent from the foregoing that a new and improved solar heat exchange panel and method of manufacture have been provided. While only the presently preferred embodiments have been described, as will be apparent to those familiar with the art, certain changes and modifications can be made without departing from the scope of the invention as defined by the following claims.

What is claimed is:

1. In a solar heat exchange panel: first and second elongated, superposed sheets of flexible material joined together along predetermined lines to form longitudinally extending inlet and outlet manifolds for receiving and discharging a circulating fluid, each of said manifolds extending substantially the entire length of the sheets, said sheets being joined together along additional lines intermediate the predetermined lines to form a plurality of separate heat exchanger sections spaced longitudinally of the sheets, each of said heat exchanger sections having a plurality of of parallel flow passageways in fluid communication with the inlet and outlet manifolds, a layer of flexible solar energy absorbant material laminated to the first sheet, and a layer of flexible thermally insulative material laminated to the second sheet.

2. The solar heat exchange panel of claim 1 further including first and second additional sheets of flexible material overlying the first sheet and secured peripherally thereto to form a first thermally insulative chamber adjacent to the flow passageways and a second insulative chamber between the additional sheets.

3. The heat exchange panel of claim 1 wherein the first and second sheets are joined together toward their lateral edges to form a plurality of longitudinally spaced apart mounting loops along each of the lateral edges.

4. The heat exchange panel of claim 1 wherein the sheets are joined together to form inlet and outlet plenum chambers extending laterally of the sheets between the heat exchanger sections, said plenum chambers providing communication between respective ones of the inlet and outlet manifolds and opposite ends of the passageways in the heat exchanger sections.

5. In a solar heat exchange panel, first and second elongated, superposed sheets of flexible material joined together along predetermined lines to form laterally spaced inlet and outlet manifolds extending substantially the entire length of the sheets for receiving and discharging a circulating fluid, a plurality of flow barriers extending laterally between the manifolds and dividing the sheets into a plurality of longitudinally spaced heat exchanger sections having a predetermined recurrent pattern of flow passageways, and means connecting the flow passageways of the heat exchanger sections in fluid communication with the inlet and outlet manifolds.

6. The heat exchange panel of claim 5 wherein the lateral margins of the sheets are joined together and cut away to form a plurality of longitudinally spaced apart mounting loops along one lateral edge of the panel.

7. In a solar heat exchange panel, first and second elongated, superposed sheets of flexible material joined together along predetermined lines to form, laterally spaced inlet and outlet manifolds extending substantially the entire length of the sheets for receiving and discharging a circulating fluid, a plurality of heat exchanger sections spaced longitudinally along the sheets, each of said sections comprising a plurality of generally parallel flow passageways, and inlet and outlet plenum chambers extending laterally of the sheets between the heat exchanger sections, the inlet plenum chambers communicating with the inlet manifold and with inlet ends of the passageways in the heat exchanger sections, and the outlet plenum chambers communicating with the outlet manifold and with outlet ends of the passageways.

8. In a solar heat exchange panel: first and second elongated, superposed sheets of flexible material joined together along predetermined lines to form inlet and outlet manifolds and flow passageways communicating with the manifolds, and a plurality of mounting loops spaced longitudinally apart along each of the lateral margins of the panel, the loops along one margin being longitudinally offset from the loops along the other margin whereby the loops along one edge of the panel can be interposed between the loops along the confronting edge of a second panel of similar character and the panels can be interlocked by a rod inserted through the interposed loops.

9. In a solar heat exchange panel, first and second elongated, superposed sheets of flexible material joined together along predetermined lines to form laterally spaced inlet and outlet manifolds extending substantially the entire length of the sheets for receiving and discharging a circulating fluid, a plurality of similar heat exchanger sections spaced longitudinally along the sheets, each of said sections comprising a plurality of longitudinally extending flow passageways, and inlet and outlet plenum chambers extending laterally of the sheets between the heat exchanger sections and communicating with the inlet and outlet manifolds and the passageways in the sections.

* * * * *